(12) United States Patent
Okada et al.

(10) Patent No.: US 9,220,979 B2
(45) Date of Patent: Dec. 29, 2015

(54) ELECTRONIC DEVICE, RECORDING MEDIUM MANAGEMENT METHOD AND PROGRAM

(75) Inventors: Michihiro Okada, Tokyo (JP); Shunichi Soma, Chiba (JP); Shigeru Enomoto, Kanagawa (JP); Toru Yamamoto, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 443 days.

(21) Appl. No.: 13/605,630

(22) Filed: Sep. 6, 2012

(65) Prior Publication Data
US 2013/0159301 A1   Jun. 20, 2013

(30) Foreign Application Priority Data
Dec. 15, 2011  (JP) .................................. 2011-275110

(51) Int. Cl.
  *A63F 13/40*   (2014.01)
  *G06F 21/10*   (2013.01)

(52) U.S. Cl.
  CPC ............... *A63F 13/10* (2013.01); *G06F 21/10* (2013.01); *A63F 2300/201* (2013.01); *A63F 2300/204* (2013.01); *A63F 2300/206* (2013.01); *H04L 2209/603* (2013.01)

(58) Field of Classification Search
  CPC ............. A63F 13/10; A63F 2300/204; A63F 2300/206; H04L 2209/603; G06F 21/10; G06F 21/105; G06F 21/12; G06F 21/121; G06F 21/123
  See application file for complete search history.

(56) References Cited

U.S. PATENT DOCUMENTS

| | | | |
|---|---|---|---|
| 7,558,820 B2 | 7/2009 | Kimoto | |
| 8,010,739 B2 | 8/2011 | Nakai | |
| 8,095,790 B2 * | 1/2012 | Takashima | .............. G06F 21/10 380/277 |

(Continued)

FOREIGN PATENT DOCUMENTS

| | | |
|---|---|---|
| CN | 101989218 A | 3/2011 |
| JP | 2006146639 A | 6/2006 |

(Continued)

OTHER PUBLICATIONS

"Windows 7," by Microsoft (Service Pack 1 copyright 2009) (screenshots provided from active software). Available from Microsoft.*

(Continued)

*Primary Examiner* — Daniel Kinsaul
(74) *Attorney, Agent, or Firm* — Matthew B. Dernier, Esq

(57) ABSTRACT

A non-transitory computer-readable medium having embodied thereon a program for implementing functions of managing a recording medium in an electronic device, includes a recording medium management module that includes: an acquisition module configured to acquire an upper limit to the number of recording media registered in the electronic device; and a registering module configured to register the recording medium in which the program is installed in the electronic device such that the acquired upper limit is not exceeded. The recording medium management module may link date and time information to a recording medium identifier identifying the recording medium in which the program is installed, and register the information and the identifier as linked in a management database used to manage the recording medium.

15 Claims, 11 Drawing Sheets

(56) References Cited

U.S. PATENT DOCUMENTS

| | | | |
|---|---|---|---|
| 8,590,051 B2* | 11/2013 | Watakabe et al. ............... 726/26 |
| 8,654,389 B2* | 2/2014 | Sakai .................... G06F 21/105 |
| | | 358/1.16 |
| 2004/0187008 A1* | 9/2004 | Harada et al. ................. 713/176 |
| 2005/0105739 A1* | 5/2005 | Ebihara .................. G06F 21/10 |
| | | 380/277 |
| 2005/0229257 A1* | 10/2005 | Kim ........................ G06F 21/10 |
| | | 726/27 |
| 2007/0162978 A1* | 7/2007 | Watanabe .......... G06Q 20/3829 |
| | | 726/27 |
| 2008/0005029 A1* | 1/2008 | Ando .............................. 705/51 |
| 2008/0225337 A1* | 9/2008 | Yano ........................... 358/1.16 |
| 2009/0144489 A1 | 6/2009 | Nakai |
| 2009/0220214 A1* | 9/2009 | Tomita ............................ 386/95 |
| 2010/0115268 A1* | 5/2010 | Kudo ........................... 713/156 |
| 2011/0029481 A1 | 2/2011 | Chen |

FOREIGN PATENT DOCUMENTS

| | | |
|---|---|---|
| JP | 2008226121 A | 9/2008 |
| JP | 2009211427 A | 9/2009 |
| JP | 2009289242 A | 12/2009 |
| JP | 2010027021 A | 2/2010 |

OTHER PUBLICATIONS

Office Action issued for corresponding Japanese Patent Application No. 2011-275110, dated Oct. 8, 2013.

Office Action issued for corresponding Chinese Patent Application No. 201210502014.4, dated Apr. 3, 2015.

* cited by examiner

ELECTRONIC DEVICE, RECORDING MEDIUM MANAGEMENT METHOD AND PROGRAM

BACKGROUND OF THE INVENTION

1. Field of the Invention

The present invention relates to an electronic device, a method of managing a recording medium executed by the electronic device, and a program configured to implement the function of managing a recording medium in the electronic device.

2. Description of the Related Art

Electronic appliances such as mobile game devices and personal digital assistants (PDA) have also been used widely. Recently, multiple-function electronic devices such as smartphones, which is provided with communication functions and in which functions of a cell phone and a PDA are integrated, have become available. These electronic devices are provided with a large-capacity memory and a high-speed processor and allow users to enjoy content without constrained by time and location by transferring content such as a movie created by another device to a recording medium in which the host electronic device can read and write.

[patent document No. 1] U.S. Pat. No. 7,558,820

To transfer given movie content (e.g., movie content recorded by a device for recording a terrestrial digital broadcast program) to a recording medium, a dedicated application may have to be installed in the recording medium due to the constraints imposed by the standard. In the process of registering and managing recording in the electronic device mediums in which such an application is installed, management will become complicated if an infinite number of recording mediums are allowed to be registered. Therefore, there is a need to manage recording mediums properly.

SUMMARY OF THE INVENTION

In this background, a purpose of the present invention is to provide a technology of managing a recording medium properly.

In order to address the aforementioned challenge, one embodiment of the present invention provides a non-transitory computer-readable medium having embodied thereon a program for implementing functions of managing a recording medium in an electronic device. The program comprises a recording medium management module that comprises: an acquisition module configured to acquire an upper limit to the number of recording media registered in the electronic device; and a registering module configured to register the recording medium in which the program is installed in the electronic device such that the acquired upper limit is not exceeded.

Another embodiment of the present invention relates to a method of managing a recording medium executed by a processor of an electronic device. The method comprises acquiring an upper limit to the number of recording media registered in the electronic device; and registering a recording medium in which a designated application program is installed in the electronic device such that the acquired upper limit is not exceeded.

Still another embodiment of the present invention relates to an electronic device. The electronic device comprises a management database used to manage a recording medium in which a designated application program is installed; and an application execution unit configured to read the application program from the recording medium and to execute the application program. The application program executed by the application execution unit registers the recording medium in which the application program is installed in the management database such that a predetermined upper limit to the number of recording media registered in the management database is not exceeded.

Yet another embodiment of the present invention relates to an electronic device. The electronic device comprises: a management database used to manage a recording medium in which a designated application program is installed such that a predetermined number of recording media is not exceeded; and a database access unit configured to access the management database. The database access unit links date and time information to a recording medium identifier identifying the recording medium in which the application program is installed, and registers the information and the identifier as linked in the management database.

Optional combinations of the aforementioned constituting elements, and implementations of the invention in the form of methods, apparatuses, systems, and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
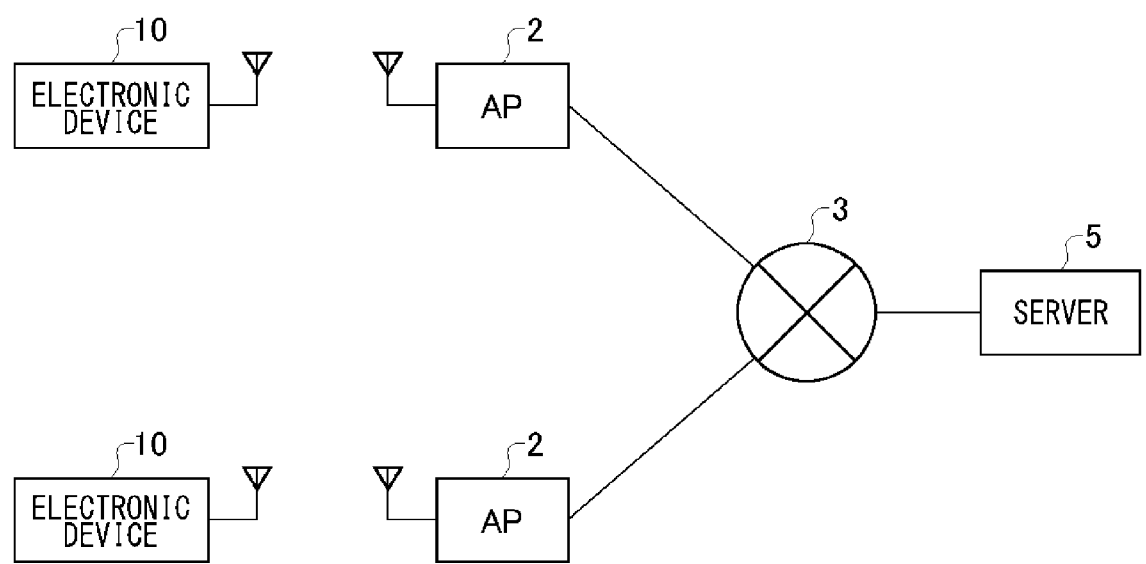
FIG. 1 shows an exemplary configuration of an information processing system according to an embodiment.

FIG. 1 shows an exemplary configuration of an information processing system 1 according to an embodiment. An access point (AP) 2 of an information processing system 1 has the functions of a wireless access point and a router. Each electronic device 10 is connected to a network 3 such as the Internet via the AP 2 and a modem (not shown).

The electronic device 10 has the function for wireless communication that allows the device 10 to connect to a server 5 on the network 3 via the AP 2 to transmit local data to the server 5 and to receive data of another electronic device 10 from the server 5. The electronic device 10 may be provided with functions of communicating using a wireless local area network (LAN) system so as to communicate with the server 5 in the infrastructure mode. The device 10 may communicate with the server 5 using a communication scheme employed in cell phones (e.g., the third-generation mobile communication system). In this case, the first electronic device 10 communicates with the server 5 via a base station, which provides a wide area of communication, so that users can use the electronic device 10 outdoors. Each user in the information processing system 1 has a user account that identifies the user and signs in network services provided by the server 5 using a user account.

A description will be given of the appearance and circuit configuration of the electronic device according to the embodiment. The electronic device 10 is exemplified by a mobile game device in the following description. However, the electronic device 10 may be a mobile terminal of another type.

[Configuration of Front Part]

Figure 2A:
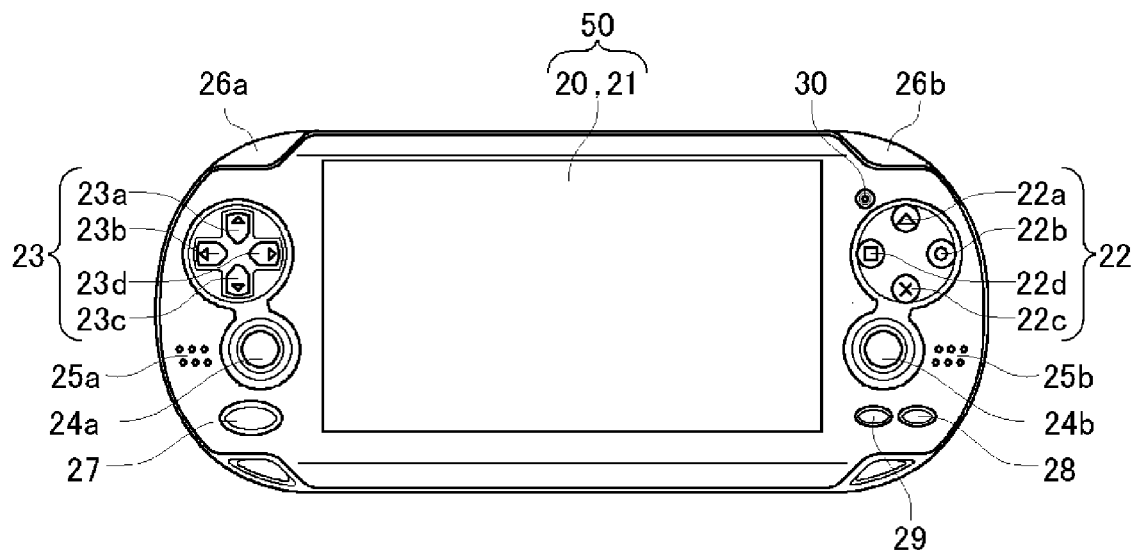
FIG. 2A shows the front face of the electronic device.

FIG. 2A shows the front face of the electronic device 10. The electronic device 10 is formed of an horizontally elongated housing. The left and right areas held by the user have an arc-shaped appearance. A rectangular touch panel 50 is provided on the front face of the electronic device 10. The touch panel 50 comprises a display device 20 and a transparent front touch pad 21 covering the surface of the display device 20. The display device 20 is an electro-luminescence panel configured to display images. The display device 20 may be a display means such as a liquid crystal panel. The front touch pad 21 is a multi-touch pad capable of detecting a plurality of simultaneously touched points so that the touch panel 50 is configured as a multi-touch screen.

A triangular button 22a, a circle button 22b, a cross button 22c, and a square button 22d (hereinafter, may be generically referred to as "user control buttons 22") are provided on the right of the touch panel 50. On the left of the touch panel 50 are provided an upward key 23a, a leftward key 23b, a downward key 23c, and a rightward key 23d (hereinafter, may be generically referred to as "directional keys 23"). The user can use the directional key 23 to designate 8 directions, including upward, downward, leftward, rightward directions, and 4 diagonal directions. Below the directional keys 23 is provided a left stick 24a, and below the user control buttons 22 is provided a right stick 24b. The user tilts the left stick 24a or the right stick 24b (hereinafter, may be generically referred to as "analog sticks 24") to input a direction and an amount of movement. At top left and top right of the housing are provided an L button 26a and an R button 26b. The user control buttons 22, the directional keys 23, the analog sticks 24, the L button 26a, and the R button 26b embody user control means used by a user.

In the neighborhood of the user control button 22 is provided a front camera 30. To the left of the left stick 24a and to the right of the right stick 24b are provided a left speaker 25a and a right speaker 25b (hereinafter, may be referred to as "speakers 25"), respectively, for outputting sound. Below the left stick 24a is provided a HOME button 27, and below the right stick 24b are provided a START button 28 and a SELECT button 29.

[Configuration of Rear Part]

Figure 2B:
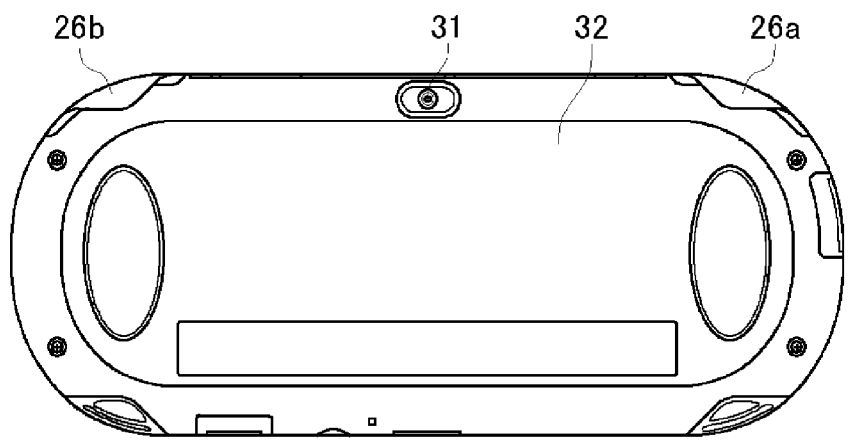
FIG. 2B shows the rear face of the electronic device.

FIG. 2B shows the rear face of the electronic device 10. The rear face of the electronic device 10 is provided with a rear camera 31 and a rear touch pad 32. Like the front touch pad 21, the rear touch pad 32 is configured as a multitouch pad. The electronic device 10 is built with two cameras and two touch pads on the front and rear faces.

[Configuration of Top Part]

Figure 3A:
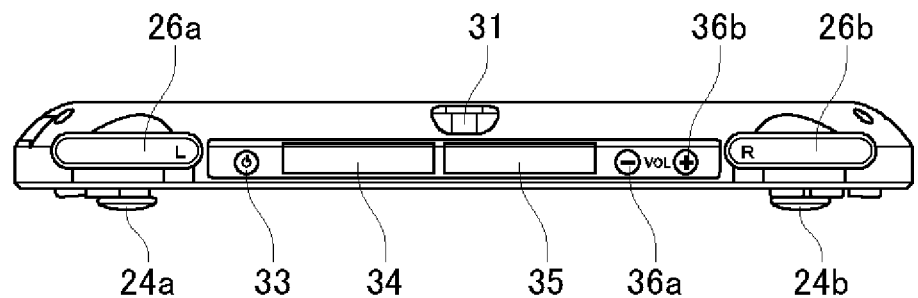
FIG. 3A shows the top face of the electronic device.

FIG. 3A shows the top face of the electronic device 10. As already described, the L button 26a and the R button 26b are provided at the left and right ends of the top face of the electronic device 10. To the right of the L button 26a is provided a power button 33. The user turns on or turns off power by pressing the power button 33. The electronic device 10 is provided with power control capabilities that send the device 10 to a suspended state when a predetermined period of time (period of absence of user control) elapses without user control means being used. Once the electronic device 10 enters a suspended state, the user can return the electronic device 10 from a suspended state to an awake state by pressing the power button 33.

A game card slot 34 is a slot where a game card is inserted. The illustration shows the game card slot 34 covered by a slot cover. An LED lamp that flashes when the game card is being accessed may be provided in the vicinity of the game card slot 34. An accessory terminal 35 is a terminal for connection with a peripheral device (accessory). The illustration shows the accessory terminal 35 covered by a terminal cover. Between the accessory terminal 35 and the R button 26b are provided a − button 36a and a + button 36b for adjusting the volume.

[Configuration of Bottom Part]

Figure 3B:
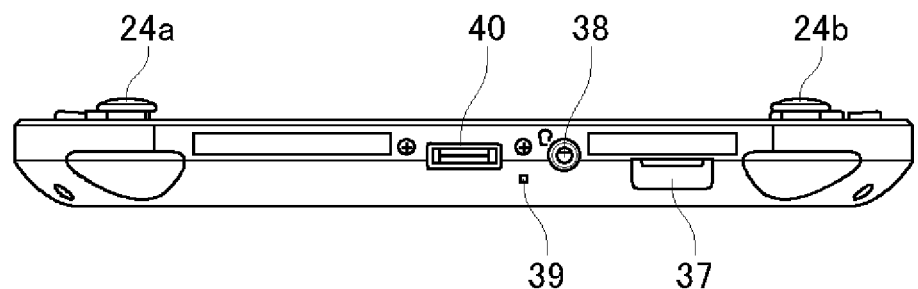
FIG. 3B shows the bottom face of the electronic device.

FIG. 3B shows the bottom face of the electronic device 10. A memory card slot 37 is a slot where a memory card is inserted. The illustration shows the memory card slot 37 covered by a slot cover. On the bottom face of the electronic device 10 are provided a sound input and output terminal 38, a microphone 39, and a multiuse terminal 40.

The Multiuser Terminal 40 is Compatible with Universal Serial

Bus (USB) and provides connection with other devices via a USB cable.

[Configuration of Left Side Part]

Figure 3C:
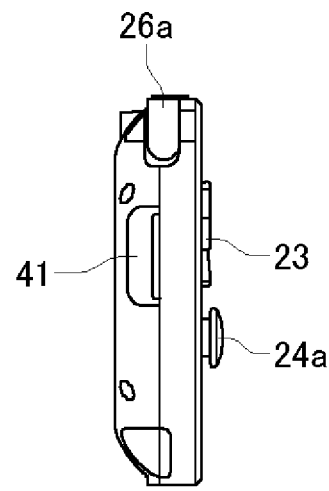
FIG. 3C shows the left side face of the electronic device.

FIG. 3C shows the left side face of the electronic device 10. On the left side face of the electronic device 10 is provided a SIM card slot 41 where a SIM card is inserted.

[Circuit Configuration of Electronic Device]

Figure 4:
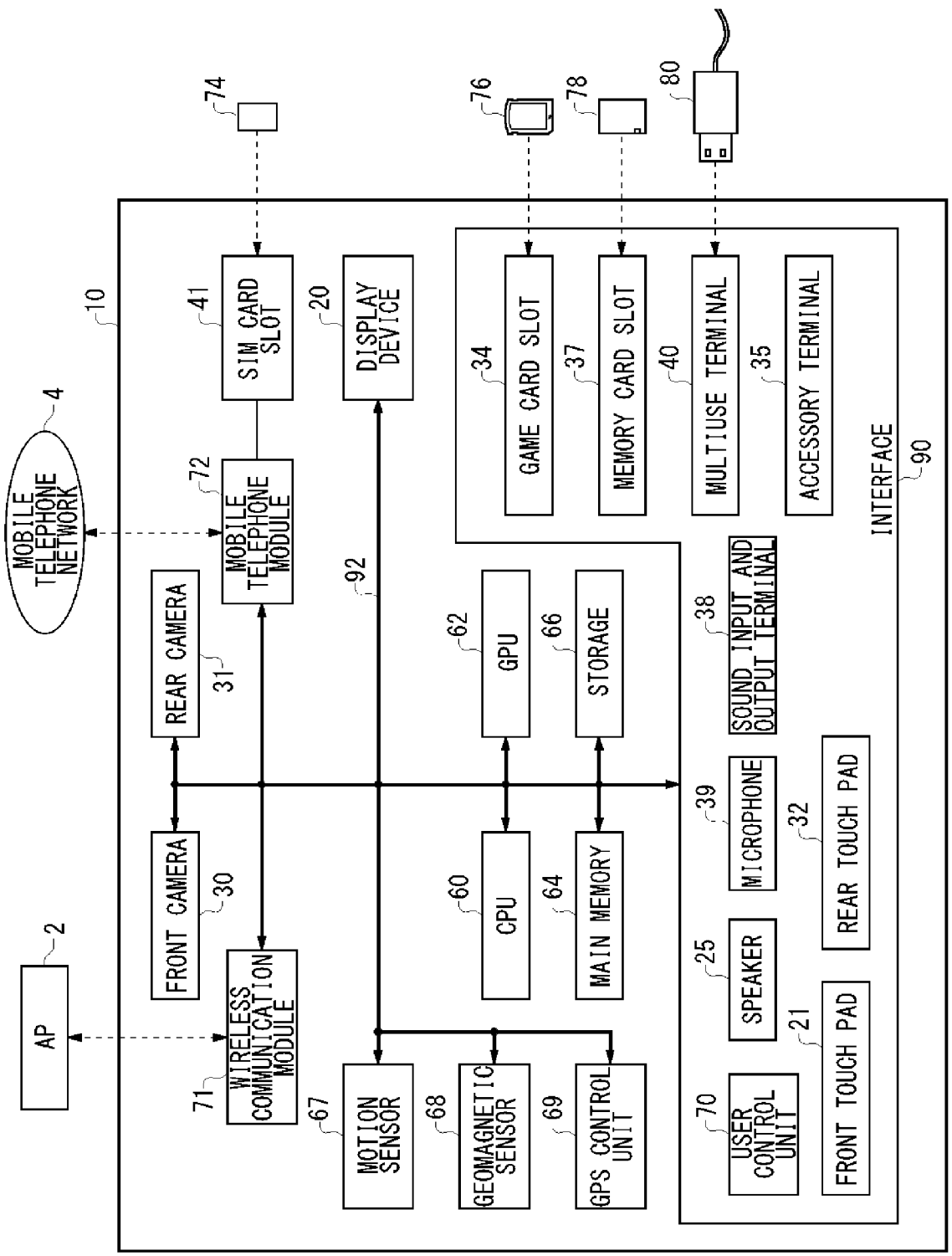
FIG. 4 shows the circuit configuration of the electronic device.

FIG. 4 shows the circuit configuration of the electronic device 10. The illustrated blocks are connected to each other via a bus 92. A wireless communication module 71 comprises a wireless LAN module compatible with a communication standard such as IEEE802.11b/g and connects to an external network via an AP2. The wireless communication module 71 may be provided with communication capabilities compatible with the Bluetooth (registered trademark) protocol. A mobile telephone module 72 is compatible with the 3rd generation digital mobile telephone scheme compliant with the International Mobile Telecommunication 2000 (IMT-2000) standard established by the International Telecommunication Union (ITU) and connects to a mobile telephone network 4. A SIM card 74 in which a unique ID identifying the telephone number of the cell phone is recorded is inserted in the SIM card slot 41. By inserting the SIM card 74 into the SIM card slot 41, the mobile telephone module 72 becomes capable of communicating with the mobile telephone network 4.

A central processing unit (CPU) 60 executes a program loaded into a main memory 64. A graphics processing unit (GPU) 62 executes computation necessary for image processing. The main memory 64 is implemented by a random access memory (RAM) and stores a program or data used by the CPU 60. A storage 66 comprises, for example, a NAND-type flash memory and is used as a built-in auxiliary storage device.

A motion sensor 67 detects the motion of the electronic device 10 and a geomagnetic sensor 68 detects geomagnetism in the directions of three axes. A GPS control unit 69 receives a signal from a GPS satellite and computes a current position. The front camera 30 and the rear camera 31 capture an image to collect image data. The front camera 30 and the rear camera 31 comprise a complementary metal oxide semiconductor (CMOS) image sensor.

The display device 20 is an organic electro-luminescence display device and is provided with light-emitting elements that emit light by applying a voltage to the cathode and the anode. In the power-saving mode, the voltage applied between the electrodes is lowered so that the display device 20 is placed in a diminished light state and power consumption is reduced. The display device 20 may be a liquid crystal panel display device provided with a backlight. In the power-saving mode, the amount of light from the backlight is reduced so that the liquid crystal panel display device is placed in a diminished light state and power consumption is reduced.

A user control unit 70 of an interface 90 includes various user control means in the electronic device 10. More specifically, the user control unit 70 includes user control buttons 22, the directional keys 23, the analog stick 24, the L button 26a, the R button 26b, the HOME button 27, the START button 28, the SELECT button 29, the power button 33, the – button 36a, and the + button 36b. The front touch pad 21 and the rear touch pad 32 are multi-touch pads. The front touch pad 21 is arranged to be superimposed on the surface of the display device 20. The speaker 25 outputs sound generated by various functions of the electronic device 10, and the microphone 39 picks up sound around the electronic device 10. The sound input and output terminal 38 receives stereo sound from an external microphone and outputs the stereo sound to, for example, an external headphone.

A game card 76 in which a game file is recorded is inserted in the game card slot 34. The game card 76 is provided with a data write enabled area. When the game card 76 is seated in the game card slot 34, the media drive writes/reads data. A memory card 78 is inserted into the memory card slot 37. Once the memory card 78 is seated in the memory card slot 37, the memory card 78 is used as an external auxiliary storage device. The multiuse terminal 40 can be used as a USB terminal. A USB cable 80 may be connected to the multiuse terminal 40 to transmit and receive data to and from other USB devices. A peripheral device is connected to the accessory terminal 35.

[Embodiment]

A summary of the embodiment of the invention will be given. The electronic device 10 according to the embodiment reads a designated application from the memory card 78 in which it is installed and executes the application. The designated application executed by the electronic device 10 registers the memory card 78 in which it is installed in the electronic device 10 such that a predefined upper limit to the number of applications is not exceeded. A plurality of memory cards 78 may be registered and managed in the electronic device 10 such that a predetermined upper limit to the number of cards is not exceeded. In each memory card 78, the designated application downloaded by the electronic device 10 is installed.

Figure 5:
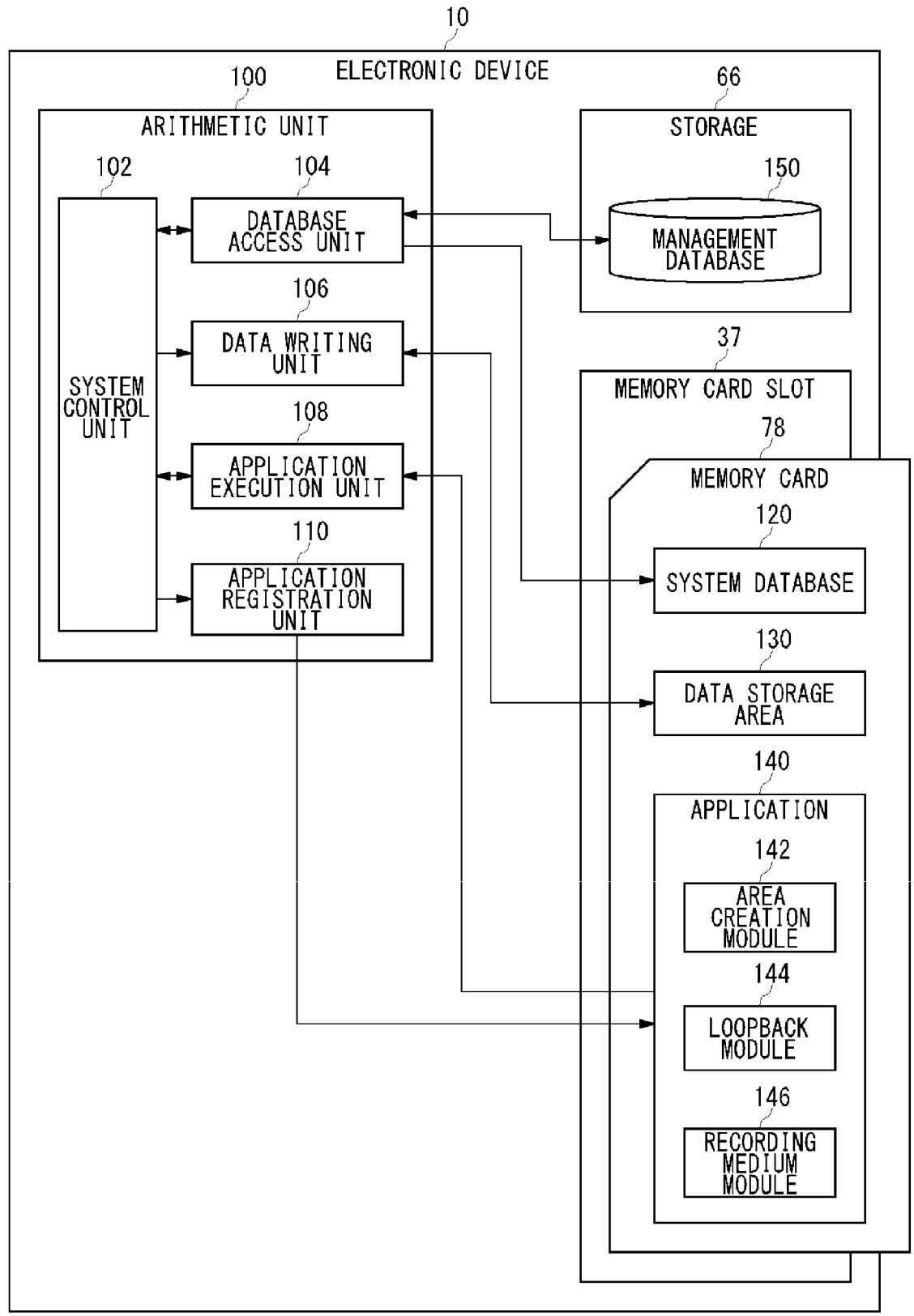
FIG. 5 schematically shows the functional features of the electronic device according to the embodiment of the present invention.

FIG. 5 schematically shows the functional features of the electronic device 10 according to the embodiment of the present invention. The electronic device 10 according to the embodiment includes an arithmetic unit 100, a storage 66, a memory card slot 37, and a memory card 78.

FIG. 5 depicts functional features of the electronic device 10 according to the embodiment that implement the function of managing recording mediums so that the other features are omitted from the illustration. The elements depicted in FIG. 5 as functional blocks for performing various processes are implemented by hardware such as a CPU, a main memory, or other LSI's, and by software such as a programs etc., loaded into the main memory. Therefore, it will be obvious to those skilled in the art that the functional blocks may be implemented in a variety of manners by hardware only, software only, or a combination of thereof.

As described above, the storage 66 comprises, for example, a NAND-type flash memory and is used as a built-in auxiliary storage device of the electronic device 10. In the electronic device 10 according to the embodiment, the storage 66 stores a management database 150. The details of the management database 150 will be described later.

The memory card slot 37 is an interface for reading and writing in the memory card 78, which functions as an external recording medium of the electronic device 10. The memory card 78 stores a system database 120, a data storage area 130, and an application 140.

The arithmetic unit 100 controls the operation of the electronic device 10 in a centralized manner. For example, the arithmetic unit 100 can be implemented by using the CPU 60 to execute the operating system program loaded into the main memory 64. The arithmetic unit 100 further includes a system control unit 102, a database access unit 104, a data writing unit 106, an application execution unit 108, and an application registration unit 110.

The application registration unit 110 installs in the memory card 78 (recording medium) an application program for implementing an application (hereinafter, "an application program for implementing an application" will simply be referred to as "application" in the specification). The application registration unit 110 downloads an application from the server 5 via the network 3 and then installs the downloaded application in the memory card 78.

The application execution unit 108 reads and executes the application stored in the memory card 78. The application registration unit 110 can install in the memory card 78 any application permitted to be installed in the memory card. The application execution unit 108 can execute any program installed in the memory card 78.

The database access unit 104 is an interface for the electronic device 10 to access the management database 150 so as to, for example, update the management database. Under the control of, for example, the designated application executed by the application execution unit 108, the database access unit 104 registers the memory card 78 in which the application is installed in the management database 150 such that a predefined upper limit to the number of applications is not exceeded. The term "designated application" as used in the embodiment refers to an application required to be installed in a portable recording medium such as the memory card 78 due to the constraints imposed by the standard.

Specific examples of designated applications include an application designed to transfer content recorded by a recording device for recording a terrestrial digital broadcast program to the memory card 78. Examples of the standard imposing the constraints include but are not limited to Embedded Memory with Playback and Recording function (EMPR). The management database 150 described above is used to manage the memory card 78 in which the designated application is installed. The memory card 78 not registered in the management database 150 cannot be accessed from applications run on the electronic device 10, including the designated application.

A content transfer application 140 for transferring content recorded by a recording device for recording a terrestrial digital broadcast program to the memory card 78 will be explained below by way of example of the designated application.

The content transfer application 140 includes an area creation module 142 for creating the data storage area 130 for storing content in the memory card 78 in which the content transfer application 140 is installed. The content transfer application 140 also includes a loopback module 144 configured to publish the data storage area 130 created by the area creation module 142 to a device outside the electronic device 10 as an independent recording medium. The content transfer application 140 further includes a recording medium management module 146 for registering the recording medium in which the content transfer application 140 is installed in the electronic device 10.

The area creation module 142 creates the data storage area 130 by creating a file in a free area in the memory card 78 and formatting the file with the File Allocation Tables (FAT) file system. The loopback module 144 publishes the data storage area 130 formatted by the area creation module 142 to a device outside the electronic device 10 as if the data storage area 130 appears as a block mass storage such as a hard disk drive.

The user may be able to select from several options the size of the data storage area 130 created by the area creation module 142 within the constraints of the free area in the memory card 78. The user can create a file size necessary to transfer data handled by the content transfer application 140 in the memory card 78, and use the remaining area to store other data such as save data of the game. Therefore, the memory card 78 can be used efficiently.

Given that the electronic device 10 is designed to store data used for system management of the electronic device 10 in the system database 120 in the memory card 78, the aforementioned approaches allows the area in the memory card 78 used by the content transfer application 140 to be fully isolated from the area used by the electronic device 10 so that the system security is improved. Examples of data stored in the system database 120 include an electronic device identifier that uniquely identifies the electronic device 10. The database access unit 104 stores in the system database 120 the electronic device identifier of the electronic device 10 used to install the designated application in the memory card 78.

The data writing unit 106 of the arithmetic unit 100 writes data in the data storage area 130 published by the loopback module 144 to the device outside the electronic device 10. More specifically, the data writing unit 106 transfers data hosted by an external device such as a terrestrial digital recorder, connected to the electronic device 10 via the multiuse terminal 40, to the data storage area 130. A movie player application (not shown) of the electronic device 10 can directly read and write data in the data storage area 130 without mediation by the loopback module 144, but the loopback module 144 may be used to read data from the data storage area 130 to play back content such as a movie stored in the data storage area 130.

The system control unit 102 of the arithmetic unit 100 manages the operation of the recording medium management module 146, the data writing unit 106, the application execution unit 108, and the application registration unit 110 in a centralized manner.

Management of the memory card 78 by the recording medium management module 146 will be explained in further detail below.

Figures 6, 7:
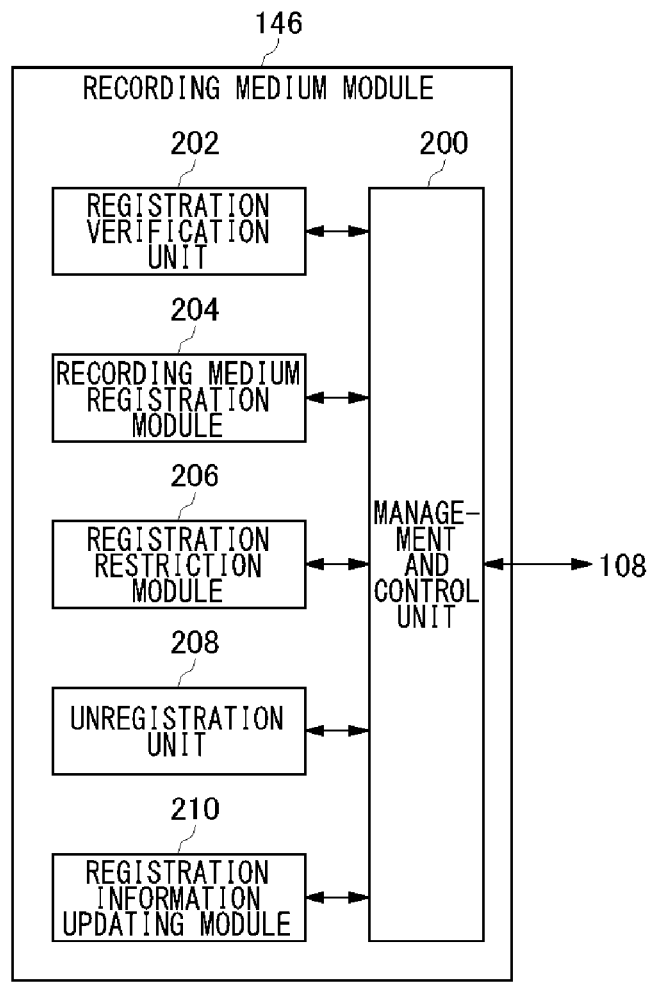
FIG. 6 schematically shows the functional features of the recording medium management module according to the embodiment.
FIG. 7 schematically shows the data structure of the management database according to the embodiment.

FIG. 6 schematically shows the functional features of the recording medium management module 146 according to the embodiment. The recording medium management module 146 according to the embodiment includes a registration verification module 202, a recording medium registration module 204, a registration restriction module 206, an unregistration module 208, a registration information updating module 210, and a management and control module 200 that manages these blocks in a centralized manner.

The recording medium registration module 204 registers date and time information and the recording medium identifier uniquely identifying the memory card 78 in the management database 150, linking the information to the identifier to each other. More specifically, the recording medium registration module 204 executed by the application execution unit 108 registers the information and the identifier in the management database 150 via the system control unit 102 and the database access unit 104. It will be assumed hereinafter that access from the application executed by the application execution unit 108 to the management database 150 takes place via the system control unit 102 and the database access unit 104, so that a description thereof will be omitted.

The "date and time information" represents information related to the date and time of generation, update, etc. of the data storage area 130 in the memory card 78. For example, the recording medium registration module 204 registers, in the management database 150, the creation date and time information indicating the date and time when the area creation module 142 newly created the data storage area 130 in the memory card 78, linking the recording medium identifier to the information.

When the data writing unit 106 updates data in the data storage area 130 already created in the memory card 78, the registration information updating module 210 registers, in the management database 150, the recording medium identifier of the memory card 78 and the date and time information indicating the date and time of update of data, linking the identifier to the information. An access information updating unit (not shown) may be provided in the recording medium management module 146 so as to register, in the management database 150, the date and time that the application (e.g., a movie player application) last accessed data in the data storage area 130 as the last access date and time information.

The recording medium registration module 204 also links the recording medium identifier to the electronic device identifier that uniquely identifies the electronic device 10 and stores the identifiers in the management database 150 accordingly. More specifically, when the area creation module 142 in the memory card 78 inserted into the memory card slot 37 of the electronic device 10 creates a new data storage area 130 in the memory card 78, the recording medium registration module 204 links the electronic device identifier to the recording medium identifier and stores the identifies in the management database 150 accordingly.

As described above, by linking the date and time information to the recording medium identifier and registering the information and the identifier in the management database 150, it is possible to analyze the status of use (e.g., a period of time used) of the memory card 78 identified by the recording medium identifier. The electronic device 10 that created the data storage area 130 in the memory card 78 identified by the recording medium identifier can be identified by referring to the electronic device identifier stored in the system database 120 in the memory card 78.

As described above, a designated application may have to be installed in a portable recording medium such as the memory card 78 due to, for example, the constraints from the standard. Installation of the content transfer application 140 in the memory card 78 will be explained by way of example. Desirably, an upper limit to the number of memory cards 78 registered in the electronic device 10 is defined. The "upper limit to the number registered" may be determined experimentally by allowing for the capacity of the storage 66 of the electronic device 10 or the assumed mode of use. By way of example, the upper limit is 4. The upper limit to the number registered is stored in, for example, the storage 66.

FIG. 7 schematically shows the data structure of the management database 150 according to the embodiment. As shown in FIG. 7, the management database 150 stores the recording medium identifier, the electronic device identifier, the creation date and time information, the update date and time information, and the last access date and time information, linking these types of information to the recording medium identifier. FIG. 7 shows a case where the upper limit to the number registered is 4. In this case, the management database 150 shown in FIG. 7 stores 4 recording medium identifiers and information linked thereto.

Reference is made back to FIG. 6. The registration restriction module 206 in the recording medium management module 146 acquires the upper limit to the number of cards registered that is stored in the management database 150. The registration restriction module 206 verifies whether the number of memory cards 78 registered in the management database reaches the acquired upper limit. If the number of memory cards 78 registered in the management database reaches the upper limit, the unregistration module 208 selects a candidate of the memory card 78 that should be unregistered from the management database 150 before the recording medium registration module 204 additionally registers the memory card 78 in the management database 150. More specifically, the unregistration module 208 refers to the date and time information registered in the management database150 as being linked to the recording medium identifier so as to select a candidate of the memory card 78 that should be unregistered.

For example, the unregistration module 208 refers to the date and time information in the management database 150 to select a memory card 78 in which the data storage area 130 was created on the earliest date and time as the candidate of unregistration. The memory card 78 in which the data storage area 130 was created on an early date and time is likely to be left unused by the user in many cases. Therefore, by presenting such a memory card 78 to the user, the user is relieved of the trouble of selecting a card to be unregistered.

By way of another example, the unregistration module 208 selects a memory card 78 in which the data in the data storage area 130 was updated on the earliest date and time as the candidate of unregistration. The term "update of data" should encompass the first instance of data transfer performed after the data storage area 130 is created. The memory card 78 in which the data is updated on an early date and time is likely to be left unused by the user in many cases. Therefore, by presenting such a memory card 78 to the user, the user is relieved of the trouble of selecting a card to be unregistered.

By way of still another example, the unregistration module 208 selects a memory card 78 in which the data in the data storage area 130 was accessed on the earliest date and time as the candidate of unregistration. The memory card 78 in which the data is last accessed on an early date and time is likely to be left unused by the user in many cases. Therefore, by presenting such a memory card 78 to the user, the user is relieved of the trouble of selecting a card to be unregistered.

If the user accepts unregistration of the memory card 78, the unregistration module 208 unregisters the memory card 78 registered in the management database 150.

The algorithm for selecting a candidate of unregistration presented by the unregistration module 208 to the user is not limited to the one described above. A skilled person would appreciate that a variety of algorithms would be possible. For example, if two items of creation date and time information registered in the management database 150 indicate events of creation close in time, the memory card 78 in which the data is updated on the earliest date and time may be selected as a candidate of unregistration.

Figure 8:
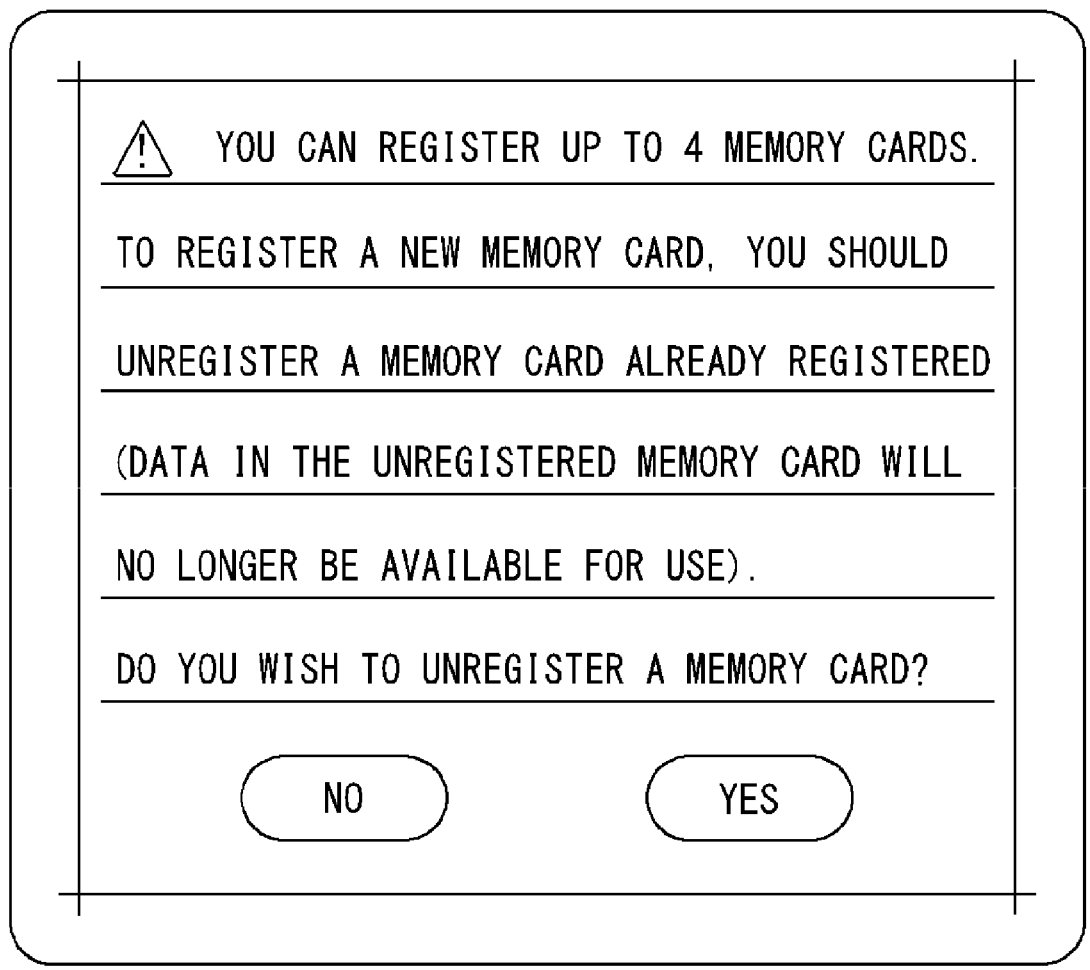
FIG. 8 shows an exemplary screen presented by the unregistration module according to the embodiment before unregistering the memory card.

FIG. 8 shows an exemplary screen presented by the unregistration module 208 according to the embodiment before unregistering the memory card 78. The screen is stored in a data area in the content transfer application 140 installed in the memory card 78 or in the storage 66 of the electronic device 10. The screen is displayed by the GPU 62 on the touch panel 50. To accept unregistration of the memory card 78, the user taps "Yes" on the touch panel 50. To refuse unregistration of the memory card 78, the user taps "No" on the touch panel 50. In this way, the unregistration module 208 can prompt the user whether to accept or refuse unregistration of the memory card 78.

Reference is made back to FIG. 6. When the memory card 78 is inserted into the memory card slot 37, the registration verification module 202 in the recording medium management module 146 verifies whether the recording medium identifier of the memory card 78 is found in the management database 150. If the recording medium identifier of the memory card 78 is not found in the management database 150, the registration verification module 202 transmits information indicating as such to the system control unit 102.

If the memory card 78 is not registered in the management database 150, the content transfer application 140 cannot access the memory card 78. Thus, when the memory card 78 is inserted into the memory card slot 37, whether the content transfer application 140 can access the memory card 78 inserted into the memory card slot 37 can be verified only by referring to the management database 150.

If the recording medium identifier of the memory card 78 is found in the management database 150, the registration verification module 202 verifies whether the electronic device identifier stored in the management database 150 linked to the recording medium identifier matches the electronic device identifier stored in the system database 120 of the memory card 78. If the electronic device identifier stored in the management database 150 linked to the recording medium identifier differs from the electronic device identifier stored in the system database 120 of the memory card 78, the registration verification module 202 causes the recording medium registration module 204 to suspend registration of the memory card 78 in the management database 150.

Generally, the memory card 78 can be removed from the electronic device 10 and carried with the user as desired. Therefore, if the data storage area 130 created in the memory card 78 is open to access by another electronic device 10, the data stored in the data storage area 130 may be distributed at will, which could possibly cause a legal problem or a problem in terms of conformity with the standard. In this regard, it is desired that the data storage area 130 created by a given electronic device 10 in the memory card 78 be prevented from being accessed by other electronic devices 10.

This is addressed by ensuring that the data storage area 130 is created from scratch in order to allow the memory card 78 in which the data storage area 130 is created by a given electronic device 10 to be used by the content transfer application 140 in another electronic device 10. As a result, the data transferred by another electronic device 10 to the memory card 78 cannot be used. Therefore, if the recording medium identifier stored in the system database 120 in the memory card 78 differs from the electronic device identifier of the electronic device 10, the registration verification module 202 causes the recording medium registration module 204 to suspend registration of the memory card 78 in the management database 150 and to indicate that the existent data in the memory card 78 cannot be used if the registration is continued.

Figure 9:
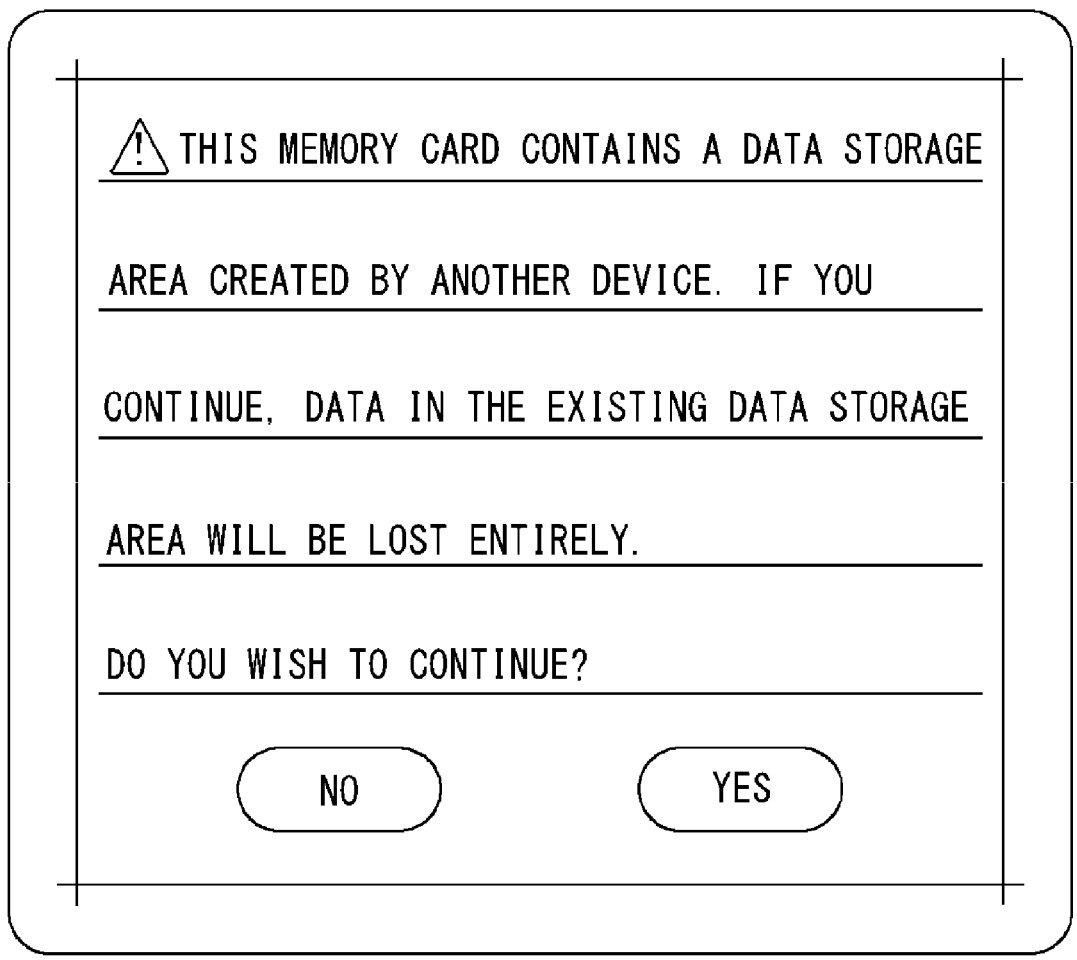
FIG. 9 shows an exemplary screen presented by the registration verification module according to the embodiment.

FIG. 9 shows an exemplary screen presented by the registration verification module 202 according to the embodiment. Like the screen presented by the unregistration module 208, the screen is also stored in a data area in the content transfer application 140 installed in the memory card 78 or in the storage 66 of the electronic device 10. The screen is displayed by the GPU 62 on the touch panel 50. To accept continuation of registration of the memory card 78, the user taps "Yes" on the touch panel 50. To refuse unregistration of the memory card 78, the user taps "No" on the touch panel 50. In this way, the recording medium registration module 204 can prompt the user whether to accept or refuse registration of the memory card 78 being used by another electronic device 10. This prevents the data from being inadvertently deleted, to the advantage of the user not desiring the data to become unusable. The data stored in the memory card 78 can continue to be used in the electronic device 10 that has registered the memory card 78

If the recording medium identifier of the memory card 78 is not found in the management database 150 and if the electronic device identifier stored in the system database 120 of the memory card 78 matches the electronic device identifier of the electronic device executing the content transfer application 140, the registration verification module 202 also causes the recording medium registration module 204 to suspend registration of the memory card 78 in the management database 150. In this case, the memory card 78 attempted to be registered in the management database 150 is considered to be registered in the management database 150 in the past but unregistered subsequently. Thus, the registration verification module 202 notifies the user that re-registration is necessary in order to use the memory card 78.

Figure 10:
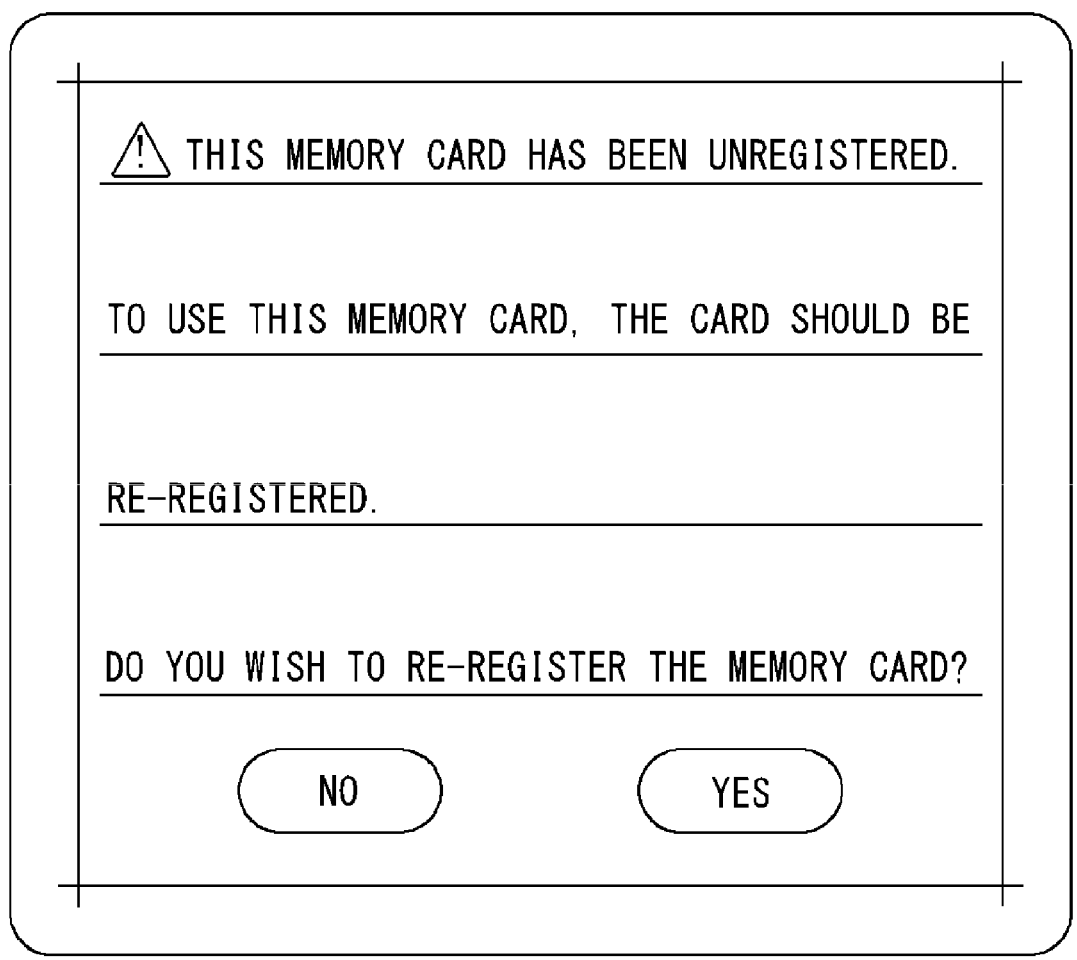
FIG. 10 is another exemplary screen presented by the registration verification module according to the embodiment.

FIG. 10 is another exemplary screen presented by the registration verification module 202 according to the embodiment. As in the case shown in FIG. 9, the screen is also stored in a data area in the content transfer application 140 installed in the memory card 78 or in the storage 66 of the electronic device 10. The screen is displayed by the GPU 62 on the touch panel 50. To accept re-registration of the memory card 78, the user taps "Yes" on the touch panel 50. To refuse unregistration of the memory card 78, the user taps "No" on the touch panel 50.

Figure 11:
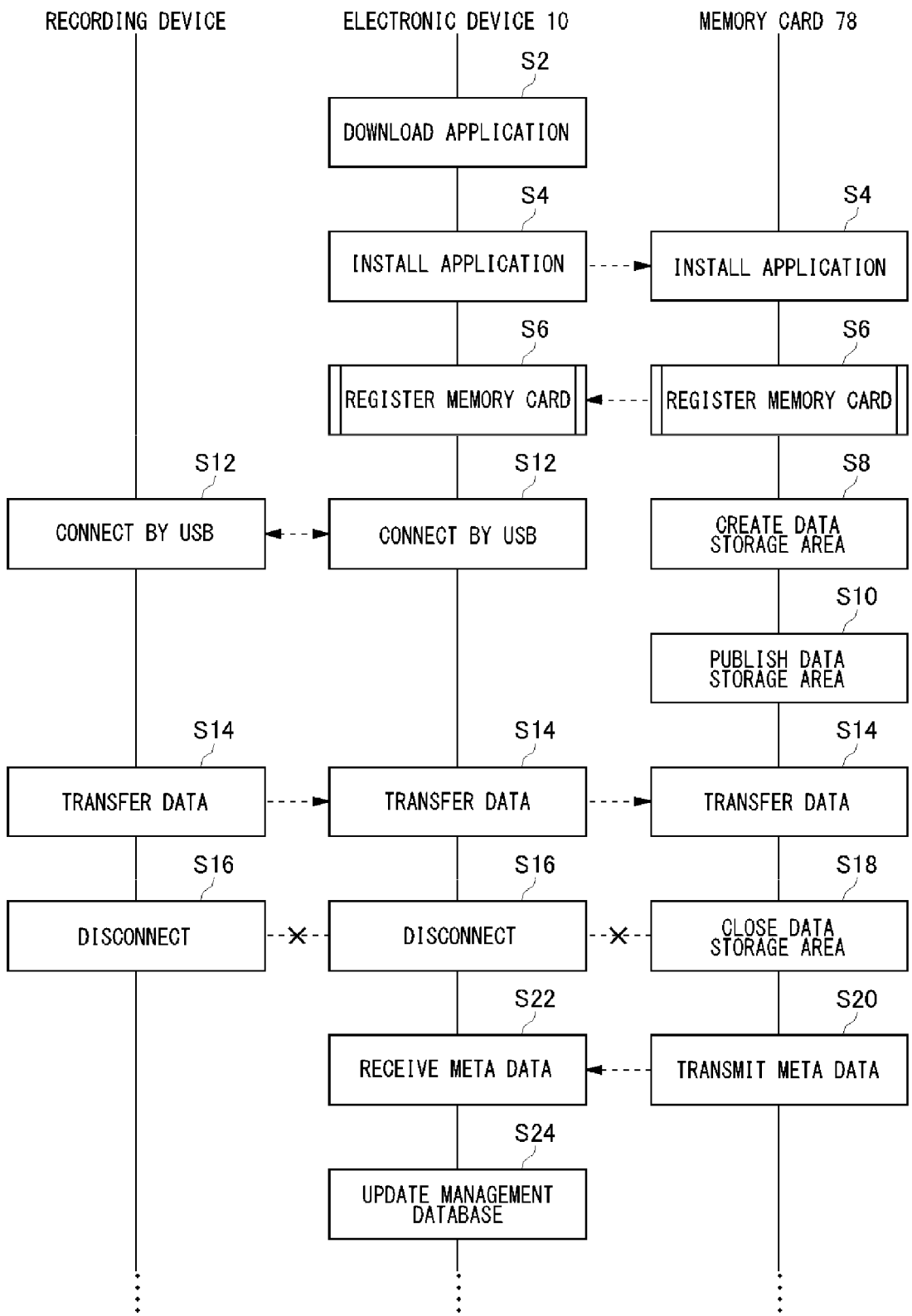
FIG. 11 is a flowchart illustrating the flow of steps performed in the electronic device according to the embodiment.

FIG. 11 is a flowchart illustrating the flow of steps performed in the electronic device 10 according to the embodiment. The application registration unit 110 downloads an application that should be installed in the memory card 78 to the main memory 64 of the electronic device 10 via the network 3 (S2).

The application registration unit 110 installs the application downloaded to the main memory 64 in the memory card 78 (S4). Examples of applications installed by the application registration unit 110 in the memory card 78 include the content transfer application 140. The recording medium registration module 204 in the recording medium management module 146 registers the memory card 78, i.e., the recording medium, inserted into the memory card slot 37, in the management database 150 (S6).

The application execution unit 108 executes the area creation module 142 in the content transfer application 140 and creates the data storage area 130 in a free area in the memory card 78 (S8). Further, the application execution unit 108 publishes the data storage area 130 created by the area creation module 142 to a device outside the electronic device 10 as a mass storage, by executing the loopback module 144 in the content transfer application 140 (S10).

The multiuse terminal 40 connects to an external recording device such as a terrestrial digital recorder via USB (S12). The external recording device, which hosts the data, recognizes the data storage area 130 as an independent recording medium. The data writing unit 106 transfers the data stored in the external recording device to the data storage area 130 (S14). When the multiuse terminal 40 disables USB connection to the external recording device (S16), the loopback module 144 closes the data storage area 130 (S18).

When the loopback module 144 closes the data storage area 130, the content transfer application 140 transmits meta data including creation date and time information and update date and time information (S20) and the application execution unit 108 receives the meta data (S22). The recording medium management module 146 updates the management database 150 according to the meta data acquired by the application execution unit 108 (S24). By repeating the above steps, the electronic device 10 is capable of managing registration of the memory card 78 which is inserted into the memory card slot 37 and in which a designated application is installed.

Update of the management database 150 by the recording medium management module 146 may not be timed to occur after the loopback module 144 closes the data storage area 130. For example, the recording medium management module 146 may update the management database 150 when the data writing unit 106 completes transferring the data to the data storage area 130.

Figure 12:
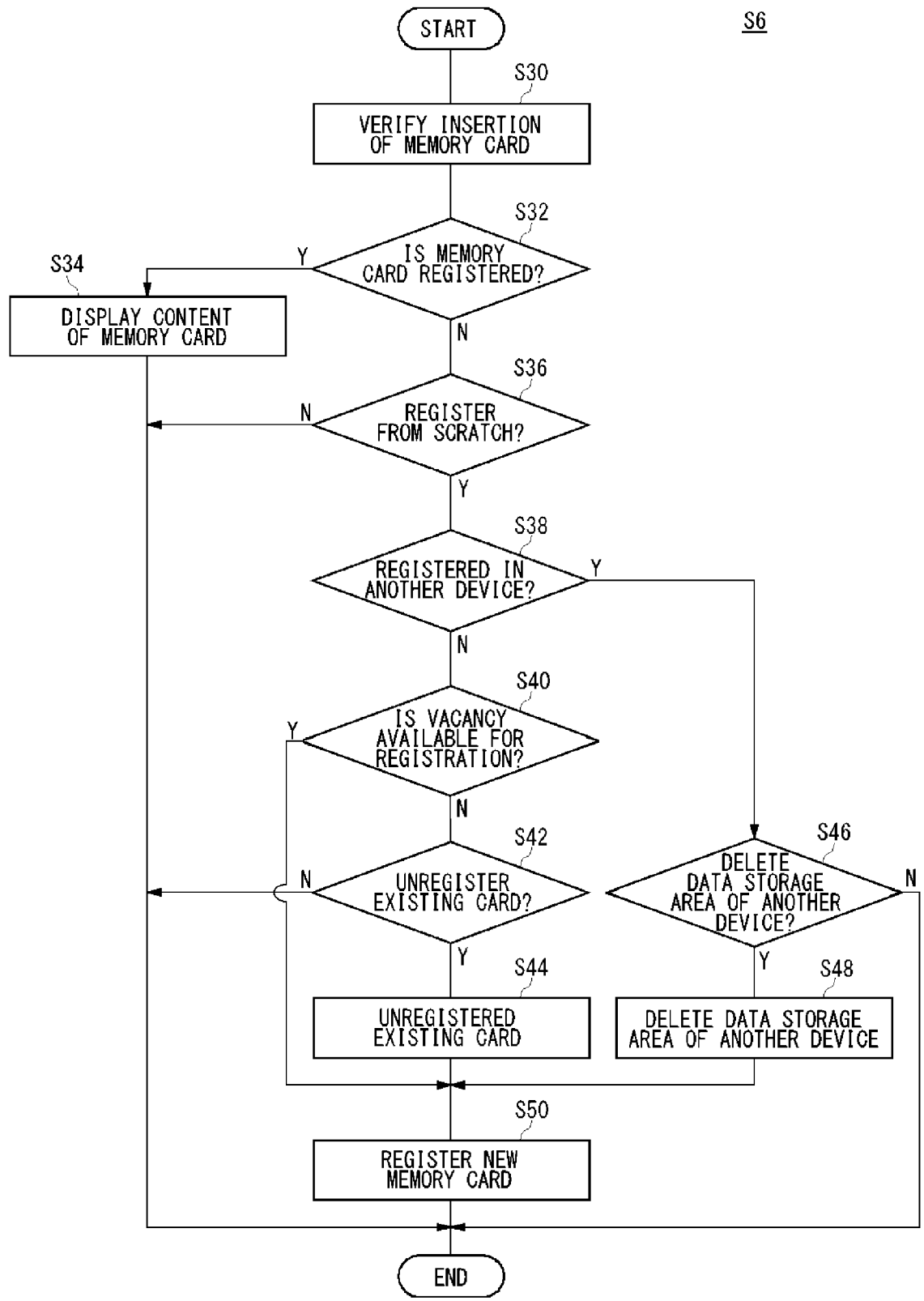
FIG. 12 is a flowchart illustrating the flow of steps of registering a memory card.

FIG. 12 is a flowchart illustrating the flow of steps of registering a memory card 78 according to the embodiment. The steps of the flowchart is started when the memory card 78 is inserted into the memory card slot 37.

The management and control module 200 in the recording medium management module 146 learns that the memory card 78 is inserted into the memory card slot 37 (S30). The registration verification module 202 verifies whether the memory card 78 is already registered by verifying whether the recording medium identifier of the memory card 78 inserted into the memory card slot 37 is found in the management database 150.

If the recording medium identifier is registered in the management database 150 (Y in S32), the application execution unit 108 displays the content of data stored in the data storage area 130 in the memory card 78 (S34). If the recording medium identifier is not registered in the management database 150 (N in S32), the recording medium registration module 204 displays a message on the touch panel 50, prompting the user whether to register the memory card 78 from scratch.

If the user selects registering the memory card 78 from scratch (Y in S36), the registration verification module 202 verifies whether the memory card 78 is used by another electronic device 10. More specifically, the registration verification module 202 verifies whether the electronic device identifier linked to the recording medium identifier is the same as the electronic device 10 uniquely identifying the electronic device 10.

If the memory card 78 is not registered by another electronic device (N in S38), the registration restriction module 206 verifies whether there is vacancy for registration in the management database 150. If there is no vacancy for registration in the management database 150 (N in S40), the unregistration module 208 displays a message on the touch panel 50, prompting the user whether to unregister one of the memory cards 78 already registered in the management database 150.

When the user selects unregistering one of the memory cards 78 already registered in the management database 150 (Y in S42), the unregistration module 208 unregisters the memory card 78 selected as the candidate of unregistration (S44).

If the memory card 78 is already registered by another electronic device (Y in S38), the registration verification module 202 displays a message on the touch panel 50, prompting the user whether to delete the data storage area 130 created by another electronic device 10. When the user selects deleting the data storage area 130 created by another electronic device (Y in S46), the area creation module 142 creates a data storage area 130 from scratch. This deletes the data storage area 130 created by another electronic device (S48).

If there is vacancy for registration in the management database 150 (Y in S40), or if the data storage area 130 created by another electronic device 10 is deleted, the recording medium registration module 204 registers the recording medium identifier of the memory card 78 in the management database 150 from scratch (S50). More specifically, the recording medium identifier of the memory card 78 is registered in the management database 150 in response to the creation of the data storage area 130 by the area creation module 142.

If the application execution unit 108 displays the content of data stored in the data storage area 130 or if the user does not select registering the memory card 78 from scratch (N in S36), if the user does not select unregistering one of the memory cards 78 already registered in the management database 150 (N in S42), if the user does not select deleting the data storage area 130 created by another electronic device (N in S46), or if the recording medium registration module 204 registers the recording medium identifier of the memory card 78 in the management database 150 from scratch, the steps in the flowchart are completed.

As described above, according to the electronic device of the embodiment, the memory card 78 (recording medium) can be managed properly.

Described above is an explanation based on an exemplary embodiment. The embodiment is intended to be illustrative only and it will be obvious to those skilled in the art that various modifications to constituting elements and processes could be developed and that such modifications are also within the scope of the present invention.

The recording medium identifier and the electronic device identifier are described above as being separately stored in the management database 150. Instead, the recording medium management module 146 may manage these types of information, by using a Hash value generated according to the recording medium identifier, the electronic device identifier, and the data stored in the data storage area 130. For example, this can be implemented by a Hash value defined in the EMPR standard mentioned above. In this case, the recording medium registration module 204 may generate a Hash value when the area creation module 142 creates the data storage area 130, and register the value in the management database 150. Similarly, the registration information updating module 210 may generate a Hash value when the data writing unit 106 updates the data in the data storage area 130, and register the value in the management database 150.

If a device such as a PC different from the electronic device 10 is used to rewrite the data in the data storage area 130, the Hash value stored in the management database in the electronic device 10 should not be updated. Therefore, by comparing the Hash value stored in the management database with the Hash value generated according to the recording medium identifier, the electronic device identifier, and the data stored in the data storage area 130, verification can be made as to whether the data in the data storage area 130 is generated or updated by the electronic device 10. For example, this can prevent the content copied to the memory card 78 by illegal means from being used by unauthorized means.

The description given above concerns management of the memory card 78 in which a designated application is installed. As described above, the electronic device 10 is capable of writing/reading in the game card 76 as well as the memory card 78 so that a designated application may be installed in the game card 76. In this case, the recording medium management module 146 may link the game card identifier capable of uniquely identifying the game card 76 to the date and time information, and register and manage the identifier and the information in the management database 150.

As described above, it is desirable that the data storage area 130 created in the memory card 78 by a given electronic device be prevented from being accessed by another electronic device 10. Therefore, the movie player application (not shown) of the electronic device 10 may verify whether the recording medium identifier stored in the system database 120 in the memory card 78 matches the electronic device identifier of the electronic device 10 before reading or writing data in the data storage area 130 and, if the identifiers do not match, the movie player application may suspend playing back the movie. This allows the determination as to whether the memory card 78 is fit for use in the electronic device 10.

What is claimed is:

1. A non-transitory computer-readable recording medium having embodied thereon a program for implementing functions of managing a recording medium in an electronic device, the program comprising a recording medium management module that comprises:
    an acquisition module configured to acquire an upper limit to the number of recording media registered in the electronic device;
    a registering module configured to register a recording medium in which the program is installed in the electronic device such that the acquired upper limit is not exceeded,
    wherein a recording medium identifier for said recording medium is registered in said electronic device;
    an area creation module that creates and formats a data storage area for storing multimedia content in the recording medium,
    wherein said registering module registers, in the electronic device, date and time information for: (1) when the area creation module created the data storage area, (2) when data in said data storage area is updated, and (3) when said data storage area was last accessed, and links said recording medium identifier to said date and time information, wherein an electronic device identifier for the electronic device that installed the program in the recording medium is stored on the recording medium, wherein said registering module links said electronic device identifier to said recording medium identifier and said date and time information in a data record stored in said electronic device, thereby providing status of use of the recording medium, wherein such a data record is created for each recording medium registered in said electronic device, the number of recording mediums registered in said electronic device being limited by the acquired upper limit; and a loopback module that publishes the data storage area to an outside device connected to said electronic device, such that the data storage area appears as a mass storage disk drive to said outside device, wherein said data storage area receives multimedia content data from said outside device, which is accessible and can be played by said electronic device.

2. The non-transitory computer-readable recording medium according to claim 1, wherein the recording medium management module further comprises a linking module configured to link date and time information to a recording medium identifier identifying the recording medium in which the program is installed, and configured to register the information and the identifier as linked in a management database used to manage the recording medium.

3. The non-transitory computer-readable recording medium according to claim 2,
wherein the recording medium management module further comprises an unregistration module configured to unregister the recording medium registered in the management database, and
wherein, if the number of recording media registered in the management database reaches the acquired upper limit, the unregistration module selects a recording media candidate to be unregistered from the management database before registering a recording medium, by referring to the date and time information registered in the management database.

4. The non-transitory computer-readable recording medium according to claim 2, further comprising a loopback module configured to publish a data storage area created by the area creation module as an independent recording medium,
wherein the recording medium management module further comprises:
a registration information updating module configured to link, when the data in the recording medium published by the loopback module is updated, the recording medium identifier of the recording medium to date and time information indicating date and time of when the data had been updated, and configured to register the identifier and the information as linked in the management database.

5. The non-transitory computer-readable recording medium according to claim 2,
wherein the recording medium further stores an electronic device identifier identifying the electronic device that installed the program in the recording medium, and
wherein the recording medium management module suspends, if the electronic device identifier stored in the recording medium is different from the electronic device identifier of the electronic device executing the program, registration of the recording medium in the management database.

6. The non-transitory computer-readable recording medium according to claim 1, further comprising:
an unregistration module configured to select a recording medium that should be unregistered from the electronic device when the number of recording mediums registered in the electronic device reaches the upper limit and an additional recording medium needs to be registered.

7. The non-transitory computer-readable recording medium according to claim 6, wherein a recording medium is selected to be unregistered based at least in part on the date and time information.

8. The non-transitory computer-readable recording medium according to claim 1, wherein registration of the recording medium in the electronic device is suspended when the electronic device identifier stored on the electronic device differs from the electronic device identifier stored on the recording medium.

9. The non-transitory computer-readable recording medium according to claim 8, wherein after registration is suspended the recording medium registration module prompts a user whether to accept or refuse registration of the recording medium.

10. The non-transitory computer-readable recording medium. according to claim 9, wherein one or both of the program or electronic device cannot access the data storage area of the recording medium unless the recording medium is registered in the electronic device.

11. The non-transitory computer-readable recording medium according to claim 1, wherein multimedia content stored in the data storage area of the recording medium is displayed when the recording medium identifier is registered on the electronic device.

12. The non-transitory computer-readable recording medium according to claim 1, wherein the recording medium registration module prompts a user whether to register the recording medium when the recording medium identifier is not yet registered on the electronic device.

13. A method of managing a recording medium executed by a processor of an electronic device, comprising:
acquiring an upper limit to the number of recording media registered in the electronic device;
registering a recording medium in which a designated application program is installed in the electronic device such that the acquired upper limit is not exceeded,
wherein a recording medium identifier for said recording medium is registered in said electronic device;
creating and formatting a data storage area for storing multimedia content in the recording medium,
registering, in the electronic device, date and time information for: (1) when said data storage area was created, (2) when data in said data storage area is updated, and (3) when said data storage area was last accessed,
linking said recording medium identifier to said date and time information,
wherein an electronic device identifier for the electronic device that installed the program in the recording medium is stored on the recording medium,
wherein said registering module links said electronic device identifier to said recording medium identifier and said date and time information in a data record stored in said device, thereby providing status of use of the recording medium, wherein such a data record is created for each recording medium registered in said electronic device, the number of recording mediums registered in said electronic device being limited by the acquired upper limit; and publishing the data storage area to an outside device connected to said electronic device, such that the data storage area appears as a mass storage disk drive to said outside device, wherein said data storage area receives multimedia content data from said outside device, which is accessible and can be played by said electronic device.

14. An electronic device comprising:

a management database used to manage a recording medium in which a designated application program is installed; and an application execution unit configured to read the application program from the recording medium and to execute the application program, wherein the application program comprises:

an acquisition module configured to acquire an upper limit to the number of recording media registered in the electronic device, a registering module configured to register a recording medium in which the program is installed in the electronic device such that the acquired upper limit is not exceeded, wherein a recording medium identifier for said recording medium is registered in said electronic device, and an area creation module that creates and formats a data storage area for storing multimedia content in the recording medium, wherein said registering module registers, in the electronic device, date and time information for: (1) when the area creation module created the data storage area, (2) when data in said data storage area is updated, and (3) when said data storage area was last accessed, and links said recording medium identifier to said date and time information, wherein an electronic device identifier for the electronic device that installed the application program in the recording medium is stored on the recording medium, wherein said registering module links said electronic device identifier to said recording medium identifier and said date and time information in a data record stored in said electronic device, thereby providing status of use of the recording medium, wherein such a data record is created for each recording medium registered in said electronic device, the number of recording mediums registered in said electronic device being limited by the acquired upper limit; and a loopback module that publishes the data storage area to an outside device connected to said electronic device, such that the data storage area appears as a mass storage disk drive to said outside device, wherein said data storage area receives multimedia content data from said outside device, which is accessible and can be played by said electronic device.

15. An electronic device comprising:

a management database used to manage a recording medium in which a designated application program is installed such that a predetermined number of recording media is not exceeded, wherein the designated application program comprises:

an acquisition module configured to acquire an upper limit to the number of recording media registered in the electronic device, a registering module configured to register a recording medium in which the program is installed in the electronic device such that the acquired upper limit is not exceeded, wherein a recording medium identifier for said recording medium is registered in said electronic device, and an area creation module that creates and formats a data storage area for storing multimedia content in the recording medium, wherein said registering module registers, in the electronic device, date and time information for: (1) when the area creation module created the data storage area, (2) when data in said data storage area is updated, and (3) when said data storage area was last accessed, and links said recording medium identifier to said date and time information, wherein an electronic device identifier for the electronic device that installed the application program in the recording medium is stored on the recording medium;

wherein said registering module links said electronic device identifier to said recording medium identifier and said date and time information in a data record stored in said electronic device, thereby providing status of use of the recording medium, wherein such a data record is created for each recording medium registered in said electronic device, the number of recording mediums registered in said electronic device being limited by the acquired upper limit; and a loopback module that publishes the data storage area to an outside device connected to said electronic device, such that the data storage area appears as a mass storage disk drive to said outside device, wherein said data storage area receives multimedia content data from said outside device, which is accessible and can be played by said electronic device.

\* \* \* \* \*